United States Patent
Kim et al.

(10) Patent No.: US 9,223,172 B2
(45) Date of Patent: *Dec. 29, 2015

(54) LIQUID CRYSTAL DISPLAY

(71) Applicant: SAMSUNG DISPLAY CO., LTD., Yongin, Gyonggi-Do (KR)

(72) Inventors: Kyeong-Hyeon Kim, Yongin (KR); Jang-Kun Song, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 88 days.

This patent is subject to a terminal disclaimer.

(21) Appl. No.: 13/963,612

(22) Filed: Aug. 9, 2013

(65) Prior Publication Data

US 2013/0321746 A1 Dec. 5, 2013

Related U.S. Application Data

(60) Continuation of application No. 13/474,759, filed on May 18, 2012, now Pat. No. 8,525,959, which is a continuation of application No. 12/421,703, filed on Apr. 10, 2009, now Pat. No. 8,184,242, which is a continuation of application No. 11/608,057, filed on Dec. 7, 2006, now Pat. No. 7,522,239, which is a division of application No. 10/706,858, filed on Nov. 12, 2003, now Pat. No. 7,164,457.

(30) Foreign Application Priority Data

Feb. 14, 2003 (KR) .............. 2003-0009354

(51) Int. Cl.
*G02F 1/1335* (2006.01)
*G02F 1/13363* (2006.01)

(52) U.S. Cl.
CPC ...... *G02F 1/133528* (2013.01); *G02F 1/13363* (2013.01); *G02F 2202/40* (2013.01); *G02F 2413/01* (2013.01); *G02F 2413/12* (2013.01)

(58) Field of Classification Search
CPC .............. G02F 1/133528; G02F 1/13363
USPC ........................................... 349/96
See application file for complete search history.

(56) References Cited

U.S. PATENT DOCUMENTS

| 6,628,359 B1 | 9/2003 | Terashita et al. |
| 2001/0030726 A1* | 10/2001 | Yoshida et al. ............ 349/117 |
| 2002/0041352 A1 | 4/2002 | Kuzuhara et al. |

(Continued)

FOREIGN PATENT DOCUMENTS

| JP | 09-090101 A | 4/1997 |
| JP | 2002-055342 | 2/2002 |
| JP | 2002-196138 | 7/2002 |
| JP | 2002-258041 | 9/2002 |

(Continued)

*Primary Examiner* — Thanh-Nhan P Nguyen
(74) *Attorney, Agent, or Firm* — F. Chau & Associates, LLC

(57) ABSTRACT

A liquid crystal display comprises: first and second panels facing each other; a compensation film and a first polarizer disposed on the first panel, the compensation film having phase retardation characteristics; and a second polarizer having a supporting film disposed on the second panel, the supporting film having phase retardation characteristics. In alternative embodiments, a supporting film is used in place of the compensation film. The supporting film has retardation characteristics.

14 Claims, 3 Drawing Sheets

(56) References Cited

U.S. PATENT DOCUMENTS

2002/0140882 A1 10/2002 Kitagawa et al.
2002/0149733 A1 10/2002 Lyu et al.
2003/0156235 A1 8/2003 Kuzuhara et al.
2004/0001175 A1 1/2004 Ito
2004/0180149 A1 9/2004 Shibue et al.

FOREIGN PATENT DOCUMENTS

| JP | 2002-267840 | 9/2002 |
| KR | 1020000039660 A | 7/2000 |
| KR | 1020010087266 | 9/2001 |
| KR | 10-2002-0078831 A | 10/2002 |

* cited by examiner

LIQUID CRYSTAL DISPLAY

CROSS-REFERENCE TO RELATED APPLICATION

This application is a continuation of U.S. patent application Ser. No. 13/474,759 filed on May 18, 2012, which is a continuation of U.S. patent application Ser. No. 12/421,703 filed on Apr. 10, 2009, which is a continuation of U.S. patent application Ser. No. 11/608,057 filed on Dec. 7, 2006, which is a is a divisional of U.S. patent application Ser. No. 10/706,858 filed on Nov. 12, 2003, which claims priority to Korean Patent Application No. 2003-0009354 filed on Feb. 14, 2003, the disclosures of which are incorporated by reference herein in their entireties.

BACKGROUND OF THE INVENTION

1. Technical Field

The present disclosure relates to liquid crystal displays, more particularly, liquid crystal displays having polarizing or compensating films.

2. Discussion of the Related Art

A liquid crystal display (LCD) includes a pair of upper and lower panels, and a liquid crystal layer interposed therebetween for housing liquid crystals. The upper panel is provided with a common electrode and color filters; the lower panel is provided with pixel electrodes and thin film transistors (TFTs). The liquid crystals in the liquid crystal layer are subjected to an electric field generated between electrodes of the upper and lower panels. The variation of the field strength changes the molecular orientations of the liquid crystals and the changed molecular orientations in turn change the transmittance of light passing through the liquid crystal display such that desired images are obtained.

Light, an electromagnetic wave, oscillates in directions perpendicular to its moving direction. Generally, the oscillation of light is not confined or biased to a particular direction. Thus, polarizers are used to direct the transmitted light. Generally, polarizers are disposed exterior to the upper or lower panels such that the light transmitted through the liquid crystal layer is polarized.

A compensation film can also be interposed between the polarizer and the upper and lower panels to enhance viewing angle and/or color inversion features of an LCD. The compensation film retards or shifts one component of the light to convert the elliptically polarized light generated by the liquid crystal display cell into linear polarized light, which can be effectively polarized by the polarizer.

Typically, a polarizer and a compensation film are separately disposed in an LCD, by affixing to the panel.

SUMMARY OF INVENTION

According to an embodiment of the present disclosure, a liquid crystal display comprises: first and second panels facing each other; a compensation film and a first polarizer disposed on the first panel, the compensation film having phase retardation characteristics; and a second polarizer having a supporting film disposed on the second panel, the supporting film having phase retardation characteristics.

Preferably, the first polarizer includes a first supporting film and the phase retardation of the first supporting film combined with the compensation film ranges about 130 nm to about 160 nm in the vertical direction. The phase retardation of the second supporting film ranges about 0 nm to about 5 nm in the horizontal direction and about 100 nm to about 140 nm in the vertical direction. The phase retardation of the compensation film ranges about 40 nm to about 60 nm in the horizontal direction and about 80 nm to about 100 nm in the vertical direction, and the phase retardation of the first supporting film ranges about 0 nm to about 5 nm in the horizontal direction and about 50 nm to about 60 nm in the vertical direction.

Preferably, an elongation direction for the polarizing medium having zero value of phase retardation in the horizontal direction is the same direction with an absorption axis of the polarizer disposed on the first panel. The compensation film is laminated perpendicular to the elongation direction of the polarizing medium.

Preferably, a liquid crystal layer for housing liquid crystals interposed between the first and the second panels. The liquid crystals are aligned in a vertical alignment mode. The polarizers include a polarizing medium made of polyvinyl alcohol (PVA). The supporting films are made of triacetate cellulose (TAC) or cellulous acetate propionate (CAP).

According to another embodiment of the present disclosure, a liquid crystal display comprises: first and second panels facing each other; and a first polarizer having a first supporting film disposed on the first panel and a second polarizer having a second supporting film disposed on the second panel, wherein the supporting films disposed on the first panel and the second panel have phase retardation characteristics.

Preferably, phase retardation of the first supporting film ranges about 40 nm to about 60 nm in the horizontal direction and about 120 nm to about 160 nm in the vertical direction, and phase retardation of the second supporting film ranges about 0 nm to about 5 nm in the horizontal direction and about 100 nm to about 140 nm in the vertical direction.

Preferably, the phase retardation of the first and second supporting films ranges about 40 nm to about 60 nm in the horizontal direction and about 120 nm to about 160 nm in the vertical direction.

Preferably, the phase retardation of the first supporting film ranges about 50 nm to about 70 nm in the horizontal direction and about 210 nm to about 250 nm in the vertical direction, and the phase retardation of the second supporting film ranges about 0 nm to about 5 nm in the horizontal direction and about 50 nm to about 60 nm in the vertical direction.

According to still another embodiment of the present disclosure, a method of forming panels in a liquid crystal display device comprises: positioning first and second panels to face each other; disposing a first polarizer having a first supporting film on the first panel; and disposing a second polarizer having a second supporting film on the second panel, wherein the supporting films disposed on the first panel and the second panel have phase retardation characteristics.

According to another embodiment of the present disclosure, a method of forming panels in a liquid crystal display device comprises: positioning first and second panels to face each other; disposing a compensation film and a first polarizer on the first panel, the compensation film having phase retardation characteristics; and disposing a second polarizer having a supporting film on the second panel, the supporting film having phase retardation characteristics.

BRIEF DESCRIPTION OF THE DRAWINGS

The present disclosure will become more apparent by describing preferred embodiments thereof in detail with reference to the accompanying drawings, of which.

DETAILED DESCRIPTION OF PREFERRED EMBODIMENTS

The present disclosure will be described more fully hereinafter with reference to the accompanying drawings, in which preferred embodiments of the disclosure are shown. This disclosure may, however, be embodied in many different forms and should not be construed as being limited to the embodiments set forth herein.

The liquid crystal displays according to embodiments of the present invention will now be described with reference to the drawings.

Figure 1:
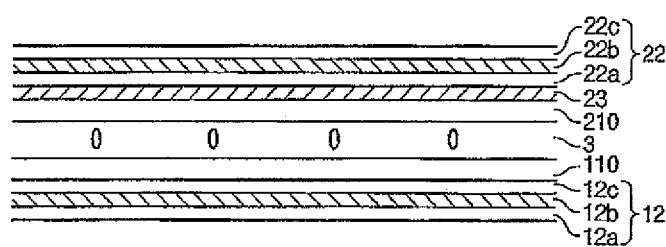
FIG. 1 is a sectional view of an LCD according to an embodiment of the present disclosure.

FIG. 1 is a sectional view of an LCD according to an embodiment of the present disclosure. As shown in FIG. 1, an LCD includes a lower panel 110, an upper panel 210, and a liquid crystal layer 3 for housing liquid crystals interposed between the lower panel 110 and the upper panel 210. The lower panel 110 includes a TFT array panel (not shown) and the upper panel 210 includes a color filter (not shown). Alignment layers (not shown) are disposed on the two panels to anchor the liquid crystals. Electrodes (not shown) for generating electric field are formed on the two panels. The liquid crystals are preferably aligned in vertical alignment (VA) mode. In VA mode, the molecules of liquid crystals are normally aligned at right angles to the panels, swinging through 90 degrees to lie parallel with the panels in the presence of the electric field.

A lower polarizer 12 is disposed under the lower panel 110. The lower polarizer comprises a polarizing medium 12b interposed between two supporting films 12a and 12c. As shown in FIG. 1, the supporting film 12c is positioned closer to the lower panel 110 as compared to the distance between the supporting film 12a and the lower panel 110.

A compensation film 23 is disposed on the upper panel 210 and an upper polarizer 22 is disposed on the compensation film 23. The upper polarizer 22 includes two supporting films 22a and 22c and a polarizing medium 22b.

The supporting films 12a, 12c, 22a, and 22c are preferably made of tri-acetyl cellulous (TAC) or cellulous acetate propionate (CAP). The polarizing mediums 12b and 22b are preferably made of polyvinyl alcohol (PVA).

The compensation film 23 is preferably formed as a thin film made of a material having different values for Nx, Ny, and Nz. Nx denotes the refractive index in the direction of its major axis. Ny denotes the refractive index in the direction of its minor axis. Nz denotes the refractive index in the direction perpendicular to the major and minor axis.

Thin films such as the lower polarizer 12, the compensation film 23, and the upper polarizer 22 exhibit phase retardation characteristics which can be used for enhancing viewing angle and/or color inversion. Phase retardation of a thin film is calculated according to the following equations:

$$Ro = (Nx - Ny)d$$

$$R' = \left(\frac{Nx + Ny}{2} - N_z\right)d$$

Here, Ro denotes phase retardation in the horizontal direction. R' denotes phase retardation in the vertical (thickness) direction. Small d denotes the thickness of the thin film.

According to an embodiment of the present disclosure, the supporting film 22a can be made with Ro which is about 0 nm to about 5 nm and R' which ranges between about 50 nm and about 60 nm. The compensation film 23 on the upper panel 210 can be made with Ro ranging between about 40 nm and about 60 nm and R' ranging between about 80 nm and about 100 nm. Thus, R' of the thin film on the upper panel 210 in total ranges between about 130 nm and about 160 nm. The supporting film 12c of the lower polarizer 12 can be made with Ro which is about 0 nm to about 5 nm and R' ranges between about 100 nm and about 140 nm. Having such characteristics, the lower polarizer 12 increases phase retardation and additional compensation films are not necessary under the lower panel 110.

Thus, the same overall effect as was achieved in conventional art using compensation film is achieved by the lower polarizer 12 without using compensation film. Although description of the above embodiment is directed to upper and lower polarizers, one ordinary skilled in the art can readily appreciate that the upper and lower panels and associated polarizers and films are interchangeable, without degradation in retardation characteristics.

Figure 2A:
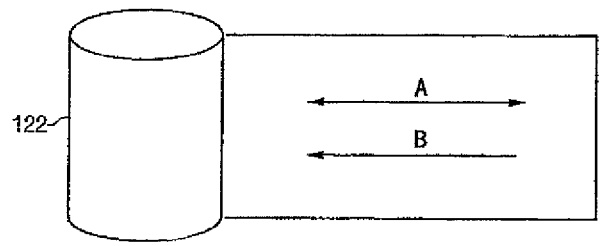
FIG. 2A shows an elongation direction of a polarizing medium.
Figure 2B:
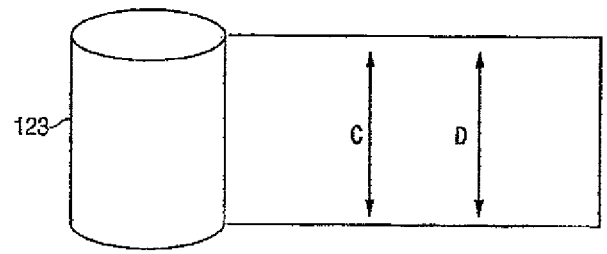
FIG. 2B shows an elongation direction of a compensation film and a supporting film.

Thin films of zero (0) Ro, i.e., thin films having no phase retardation in their horizontal direction, can be fabricated by lamination using a roll. FIG. 2A shows an elongation direction for the polarizing medium 22b. FIG. 2B shows an elongation direction for the compensation film 23.

As shown in FIGS. 2A and 2B, an absorption axis B of the upper polarizer 22 along which the light vanishes is the same as an elongation direction A of the polarizing medium 22b. A polarization axis (not shown) of the upper polarizer 22 along which the light penetrates is perpendicular to the elongation direction A of the polarizing medium 22b. A phase retardation axis D of the compensation film 23 having non-zero value of Ro should be perpendicular to the absorption axis B of the upper polarizer 22. Therefore, the compensation film 23 is preferably laminated in the direction C perpendicular to the elongation direction A of the polarizing medium 22b.

Figure 3:
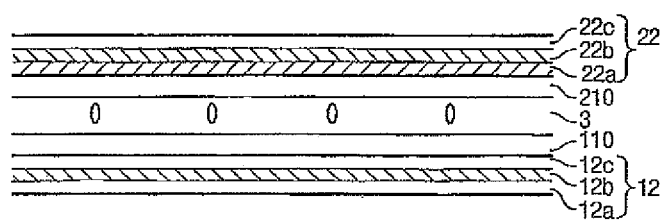
FIG. 3 is a sectional view of an LCD according to another embodiment of the present disclosure.

FIG. 3 is a sectional view of an LCD according to another embodiment of the present disclosure. As shown in FIG. 3, an LCD includes a lower panel 110, an upper panel 210, and a liquid crystal layer 3 for housing liquid crystals interposed between the lower panel 110 and the upper panel 210. The liquid crystals are preferably aligned in vertical alignment (VA) mode. A lower polarizer 12 is disposed on the lower panel 110. The lower polarizer comprises a polarizing medium 12b interposed between two supporting films 12a and 12c. The upper polarizer 22 includes two supporting films 22a and 22c and a polarizing medium 22b.

The supporting film 22a is preferably formed as a thin film made of a material having different values for Nx, Ny, and Nz. The supporting films 12a, 12c, and 22c can be made of tri-acetyl cellulous (TAC) and the polarizing medium 12b and 22b can be made of poly-vinyl alcohol (PVA). The supporting film 22a can be made with Ro which ranges between about 40 nm and about 60 nm and R' which ranges between about 120 nm and about 160 nm. The supporting film 12c can be made with Ro which is about 0 nm to about 5 nm and R' which ranges between about 100 nm and about 140 nm.

The lower polarizer 12 increases phase retardation because the supporting film 12c has R' ranging between about 100 nm and about 140 nm. The upper polarizer 22 increases phase retardation because the supporting film 22a has Ro ranging between 40 nm and 60 nm and R' ranging between about 120 nm and about 160 nm. Thus, a compensation film is neither necessary under the lower panel 110 nor above the upper panel 210.

Figure 4A:
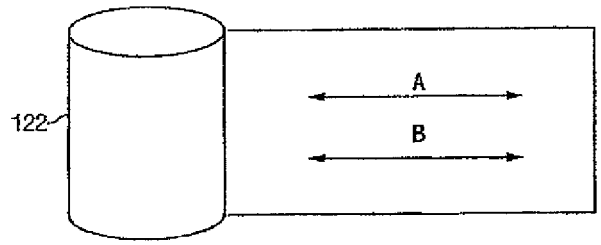
FIG. 4A shows an elongation direction of a polarizing medium.
Figure 4B:
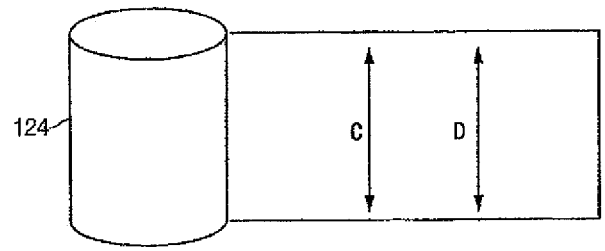
FIG. 4B shows an elongation direction of a supporting film.

FIG. 4A shows the elongation direction for the polarizing medium 22b. FIG. 4B shows the elongation direction for the supporting film 22a. As shown in FIGS. 4A and 4B, an absorption axis B of the upper polarizer 22 along which the light vanishes is the same as an elongation direction A of the polarizing medium 22b. A polarization axis (not shown) of the upper polarizer 22 along which the light penetrates is perpendicular to the elongation direction A of the polarizing medium 22b.

A phase retardation axis D of the supporting film 22a having non-zero value of Ro is the same as an elongation direction C of the supporting film 22a. The phase retardation axis of the supporting film 22a having non-zero value of Ro should be perpendicular to the absorption axis B of the upper polarizer 22. The supporting film 22a can be laminated in the direction C perpendicular to the elongation direction A of the polarizing medium 22b.

Figure 5:
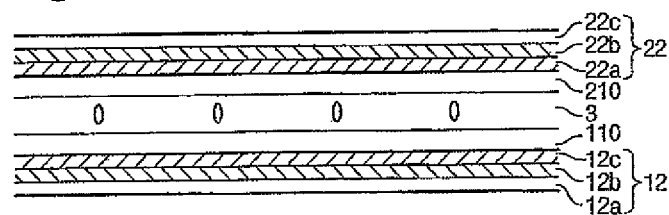
FIG. 5 is a sectional view of an LCD according to still another embodiment of the present disclosure.

According to still another embodiment of the present disclosure as shown in FIG. 5, the supporting film 12c and the supporting film 22a are preferably formed as thin films made of a material having different values of Nx, Ny, and Nz. The supporting films 12a and 22c can be made of tri-acetyl cellulous (TAC) and the polarizing mediums 12b and 22b can be made of poly-vinyl alcohol (PVA).

Both the supporting film 12c and the supporting film 22a can be made with Ro which ranges between about 40 nm and about 60 nm and R' which ranges between about 120 nm and about 160 nm. The lower polarizer 12 increases its phase retardation because the supporting film 12c has Ro ranging between about 40 nm and about 60 nm and R' ranging between about 120 nm and about 160 nm. The upper polarizer 22 increases its phase retardation because the supporting film 22a has Ro ranging between about 40 nm and about 60 nm and R' ranging between about 120 nm and about 160 nm.

Figure 6A:
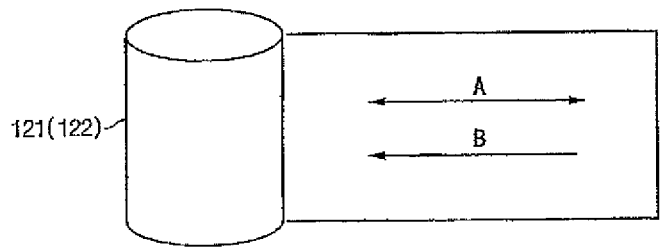
FIG. 6A shows an elongation direction of a polarizing medium.
Figure 6B:
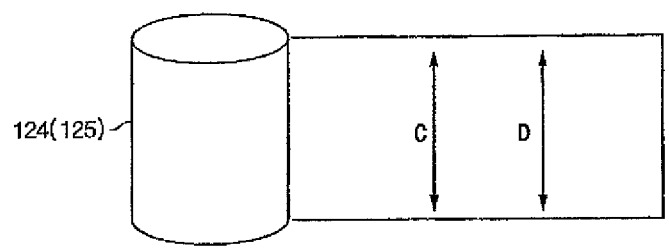
FIG. 6B shows an elongation direction of a supporting film.

FIG. 6A shows the elongation direction for the polarizing medium 12b and the polarizing medium 22b. FIG. 6B shows the elongation direction for the supporting film 22a and the supporting film 12c.

As shown in FIGS. 6A and 6B, an absorption axis B of the upper polarizer 22 along which the light vanishes is the same as an elongation direction A of the polarizing medium 22b. A polarization axis (not shown) of the upper polarizer 22 along which the light penetrates is perpendicular to the elongation direction A of the polarizing medium 22b. An absorption axis B of the lower polarizer 12 along which the light vanishes is the same as an elongation direction A of the polarizing medium 12b. A polarization axis (not shown) of the lower polarizer 12 along which the light penetrates is perpendicular to the elongation direction A of the polarizing medium 12b.

A phase retardation axis D of the supporting film 22a having non-zero value of Ro is the same as an elongation direction C of the supporting film 22a. The phase retardation axis D of the supporting film 22a having non-zero value of Ro should be perpendicular to the absorption axis B of the upper polarizer 22. A phase retardation axis D of the supporting film 12c having non-zero value of Ro is the same as an elongation direction C of the supporting film 12c. The phase retardation axis D of the supporting film 12c having a non-zero value should be perpendicular to the absorption axis B of the upper polarizer 22.

The supporting film 22a can be laminated in the direction C perpendicular to the elongation direction A of the polarizing medium 22b. The supporting film 12c can be laminated in the direction C perpendicular to the elongation direction A of the polarizing medium 12b.

Figure 7:
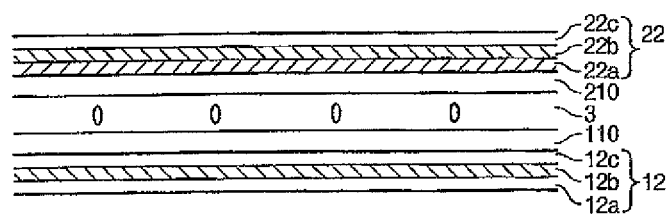
FIG. 7 is a sectional view of an LCD according to another embodiment of the present disclosure.

FIG. 7 is a sectional view of an LCD according to still another embodiment of the present disclosure. As shown in FIG. 7, an LCD includes a lower panel, an upper panel 210, and a liquid crystal layer 3 for housing liquid crystals interposed between the lower panel 110 and the upper panel 210. The liquid crystals are preferably aligned in vertical alignment (VA) mode. A lower polarizer 12 is disposed on the lower panel 110. The lower polarizer comprises a polarizer medium 12b interposed between two supporting films 12a and 12c. The upper polarizer 22 includes two supporting films 12a and 12c. The upper polarizer 22 includes two supporting films 22a and 22c and a polarizing medium 22b.

The supporting film 22a is preferably formed as a thin film made of a material having different values for Nx, Ny, and Nz. The supporting films 12a, 12c, and 22c can be made of tri-acetyl cellulous (TAC) and the polarizing medium 12b and 22b can be made of poly-vinyl alcohol (PVA). The supporting film 22a can be made with Ro which ranges between about 50 nm and about 70 nm and R' which ranges between about 210 nm and about 250 nm. The supporting film 12c can be made with Ro which is about 0 nm to about 5 nm and R' which ranges between about 50 nm and about 60 nm.

The lower polarizer 12 increases phase retardation because the supporting film 12c has R' ranging between about 50 nm and about 60 nm. The upper polarizer 22 increases phase retardation because the supporting film 22a has Ro ranging between 50 nm and 70 nm and R' ranging between about 100 nm and about 140 nm. Thus, a compensation film is neither necessary under the lower panel 110 nor above the upper panel 210.

Elongation directions for the polarizing medium 22b and the supporting film 22a are the same with the embodiment described in connection with FIGS. 4A and 4B.

Although preferred embodiments of the present disclosure have been described in detail hereinabove, it should be clearly understood that many variations and/or modifications of the basic inventive concept herein taught which may appear to those skilled in the present art will still fall within the spirit and scope of the present invention, as defined in the appended claims.

What is claimed is:
1. A liquid crystal display device, comprising:
first and second panels facing each other;
a first polarizer having a first supporting film disposed on the first panel, a first polarizing medium disposed on the first supporting film, and a second supporting film disposed on the first polarizing medium; and
a second polarizer having a third supporting film disposed on the second panel, a second polarizing medium disposed on the third supporting film, and a fourth supporting film disposed on the second polarizing medium, wherein a phase retardation of the third supporting film ranges about 40 nm to about 60 nm in the horizontal direction and about 120 nm to about 160 nm in the vertical direction, and wherein the first, second and fourth supporting films comprise triacetate cellulose (TAC).

2. The liquid crystal display device as in claim 1, further comprising a liquid crystal layer disposed between the first panel and the second panel.

3. The liquid crystal display device as in claim 2, wherein the liquid crystal layer is aligned in a vertical alignment mode.

4. The liquid crystal display device as in claim 3, wherein the third supporting film is a thin film having different values for Nx, Ny, and Nz wherein Nx denotes the refractive index in the direction of major axis, Ny denotes the refractive index in the direction of minor axis, and Nz denotes the refractive index in the direction perpendicular to the major and minor axis.

5. The liquid crystal display device as in claim 3, wherein the first and second polarizing mediums are made of polyvinyl alcohol (PVA).

6. The liquid crystal display device as in claim 5, wherein an elongation direction for the second polarizing medium is substantially the same direction with an absorption axis of the second polarizer disposed on the second panel.

7. The liquid crystal display device as in claim 6, wherein an elongation direction for the third supporting film is perpendicular to the absorption axis of the second polarizer disposed on the second panel.

8. A method of forming panels in a liquid crystal display device, comprising:

positioning first and second panels to face each other;

disposing a first polarizer having a first supporting film on the first panel, a first polarizing medium on the first supporting film, and a second supporting film on the first polarizing medium; and disposing a second polarizer having a third supporting film on the second panel, a second polarizing medium on the third supporting film, and a fourth supporting film on the second polarizing medium, wherein a phase retardation of the third supporting film ranges about 40 nm to about 60 nm in the horizontal direction and about 120 nm to about 160 nm in the vertical direction, and wherein the first, second and fourth supporting films comprise triacetate cellulose (TAC).

9. The method as in claim 8, further comprising disposing a liquid crystal layer between the first and the second panels.

10. The method as in claim 9, wherein the liquid crystal layer is aligned in a vertical alignment mode.

11. The method as in claim 10, wherein the third supporting film is a thin film having different values for Nx, Ny, and Nz wherein Nx denotes the refractive index in the direction of major axis, Ny denotes the refractive index in the direction of minor axis, and Nz denotes the refractive index in the direction perpendicular to the major and minor axis.

12. The method as in claim 11, wherein the first and second polarizing mediums are made of polyvinyl alcohol (PVA).

13. The method as in claim 12, wherein an elongation direction for the second polarizing medium is substantially the same direction with an absorption axis of the second polarizer disposed on the second panel.

14. The method as in claim 13, wherein an elongation direction for the third supporting film is perpendicular to the absorption axis of the second polarizer disposed on the second panel.

* * * * *